United States Patent [19]
Etra et al.
[11] 3,866,185
[45] Feb. 11, 1975

[54] METHOD AND APPARATUS FOR GATHERING PEAK LOAD TRAFFIC DATA

[75] Inventors: Richard Henry Etra, Highland Park; Victor Llewellyn Ransom, New Shrewsbury, both of N.J.

[73] Assignee: Bell Telephone Laboratories, Incorporated, Murray Hill, N.J.

[22] Filed: Jan. 16, 1974

[21] Appl. No.: 433,780

[52] U.S. Cl. .............................................. 340/172.5
[51] Int. Cl. .............................................. G06f 3/04
[58] Field of Search ....................... 340/172.5; 444/1

[56] References Cited

UNITED STATES PATENTS

| | | | |
|---|---|---|---|
| 3,231,866 | 1/1966 | Goetz | 340/172.5 |
| 3,540,003 | 11/1970 | Murphy | 340/172.5 |
| 3,546,678 | 12/1970 | Callaway et al. | 340/172.5 |
| 3,588,837 | 6/1971 | Rash et al. | 340/172.5 |
| 3,623,019 | 11/1971 | Groth | 340/172.5 |
| 3,732,547 | 5/1973 | Etra | 340/172.5 |
| 3,760,105 | 9/1973 | Puccini | 340/172.5 |

*Primary Examiner*—Gareth D. Shaw
*Assistant Examiner*—John P. Vandenburg
*Attorney, Agent, or Firm*—C. S. Phelan

[57] ABSTRACT

Specified signal state changes, occurring in a plurality of communication circuits during each of plural predetermined collection intervals are detected and stored in a first memory as traffic data. A comparison is made between this traffic data and peak traffic data collected during a predetermined measurement interval, a measurement interval including many collection intervals, the peak traffic data being stored in a second memory. When the traffic data of a present collection interval exceeds that of the measurement interval, this data is stored as the new peak data in the second memory. Periodically, an output reading of the second memory is effected, with the peak traffic data being either directly displayed or made available for transmission to a centralized collection facility upon request over dialed-up voice grade circuits.

14 Claims, 5 Drawing Figures

METHOD AND APPARATUS FOR GATHERING PEAK LOAD TRAFFIC DATA

BACKGROUND OF THE INVENTION

1. Field of the Invention

This invention relates to methods and apparatus for monitoring equipment and gathering traffic data and, more particularly, to methods and apparatus for gathering peak load traffic data.

2. Description of the Prior Art

Analysis of the various factors and conditions affecting business operation requires the accumulation of large quantities of statistical data. In the telephone industry, for example, studies are conducted regularly and periodically to accumulate data with regard to telephone equipment utilization. Interpretation of the accumulated data facilitates the proper assignment and disposition of the various telephone lines and equipment, determines the quantities of equipment necessary to handle given volumes of telephone traffic, and provides for further planning with regard to probable telephone equipment requirements. Thus, sufficiency of present units of equipment may be determined, units may be reallocated to areas of greater need, additional units may be allotted, and the number of circuits between central offices may be altered. In the alternative other appropriate action may be taken to provide optimum service consistent with overall economy of operation.

The data obtained in these traffic studies may take various forms, but it is principally of two types. One of these types of statistical data relates to traffic volumes, or "peg counts," and provides information on how many calls were made or how often a particular unit of equipment was used in a given period of time. This type of traffic data may be obtained by connecting monitoring equipment to the various units of telephone equipment to be observed and registering an indication of a specified change in signal state upon the seizure or release of the unit of equipment. No regard is given to the length of time the equipment is seized or used but only to the total number of seizures. Peg count data is necessarily obtained, therefore, on a random basis.

The other type of statistical data obtained from traffic studies relates to traffic density, or percentage usage of the various units of equipment. This usage data may be obtained, for example, by repeatedly scanning the various units of equipment at regular intervals and registering indications of whether the individual units of equipment are seized or in use at the time of the scan. By assuming that a seizure or busy condition which is present at the time of the scan exists for the interval between successive scans, then each indication registered is indicative of a precise period of usage of the individual unit of equipment being observed. Proper selection of the scanning interval provides the usage data in standard units of traffic measurement. For example, a scanning rate of 36 scans per hour produces usage indications in terms of hundred-call-seconds (CCS).

Accordingly, it is one object of the present invention to configure traffic measurement apparatus for accumulating either peg count traffic data or traffic usage data.

Before the accumulated statistical data was of practical use heretofore considerable time and energy had been required in compiling, interpreting and summarizing such data. Moreover, costly dedicated data links or frequent polling of the remote traffic measurement apparatus was required to ascertain the peak traffic occurring in a prescribed time interval.

Consequently, a further object is to eliminate the need for dedicated data links to obtain statistical peak load traffic data.

Another object is to reduce the frequency of polling of the remote traffic measurement apparatus.

More recent traffic measurement systems reduce the amount of time required to process the vast quantities of data accumulated by using centralized data processing facilities. However, where large numbers of remote central offices are to be monitored, the real time constraints of any centralized data processing facility preclude the handling in real time of large numbers of units in any given period of time.

Therefore, a further object of the present invention is to reduce the data processing burden on a centralized processing facility so that the time lag between the measurement of raw data and the availability of the processed data is decreased.

An additional object is to configure peak load traffic measurement apparatus which provides local access to the processed data as well as remote access through voice grade circuits to a centralized data processing facility.

Still another object is to make the measurement of peak load traffic inexpensive and, therefore, available to small, remote telephone central offices as well as to large metropolitan telephone central offices.

SUMMARY OF THE INVENTION

The foregoing and other objects of the invention are realized in an illustrative embodiment wherein peak load traffic data gathering apparatus is configured to monitor and record either peg count data or traffic usage data on as many as N input signal communication circuits. Utilization of the peak load traffic data gathering apparatus for collection of peg count data requires a last-look memory since only new seizures are to be counted. When a new seizure occurs in the peg count mode, a count of the number of new seizures for the input circuit being monitored is incremented and stored in a first memory. A similar incrementing of a usage count occurs during a collection interval whenever an input shows or continues to show a busy condition during a scan when the peak load traffic data gathering apparatus is configured in the usage mode. After the current count is updated, the input counts stored in the first memory are compared with peak totals collected during a previous measurement interval, the peak totals being stored in a second memory. A measurement interval as used herein includes many collection intervals and a single collection interval includes many scans. In a single scan all inputs to be monitored are sampled one time.

Should the comparison show the present data count to be greater than that currently stored in the second memory, the current data count is entered into the second memory as the new peak count. To implement readout of the peak data from the second memory, there is provided output circuitry which decodes and conditions the data for application to a local visual display, or the data may be applied upon request to a data set for subsequent transmission to a central collection point.

Accordingly, it is one feature of the present invention that the collection of either peak peg count or peak traffic usage data is selectable.

Another feature is that the peak traffic data gathered is conditioned for local visual display and for transmission to a central data collection point over dialed-up voice grade circuits thereby eliminating the need for dedicated data links.

It is a further aspect of the invention that the gathering of only peak traffic data during prescribed time intervals, when coupled with the elimination of dedicated data links, results in inexpensive traffic data gathering apparatus which is suitable for use in small, remote telephone central offices.

BRIEF DESCRIPTION OF THE DRAWINGS

The aforementioned aspects, features and objects of the invention as well as other aspects, features and objects will be better understood upon a consideration of the following detailed description and the appended claims in connection with the attached drawings of an illustrative embodiment in which:

FIG. 1*a* is arranged to the left of FIG. 1*b*, comprise a block diagram of a peak load traffic data gathering apparatus embodied in accordance with the principles of the invention;

DETAILED DESCRIPTION

The description of the method and apparatus for gathering peak load traffic data will be presented by way of an illustrative example. For the example it will be assumed that the peak traffic on N input circuits is to be ascertained, where N is equal to eight. A count of discrete signal state changes associated with each input will be referred to as a data word and the count will be represented as a three digit binary coded decimal (BCD) word having 12 bits. It will be further assumed for the example that all logic state transitions will occur on the positive-going edge of the logic signals except in the case of logic gates and strobe inputs which are threshold actuated. Before describing the data gathering portion of the apparatus, a description of the circuitry for generating timing control signals will be presented.

Figure 1A:
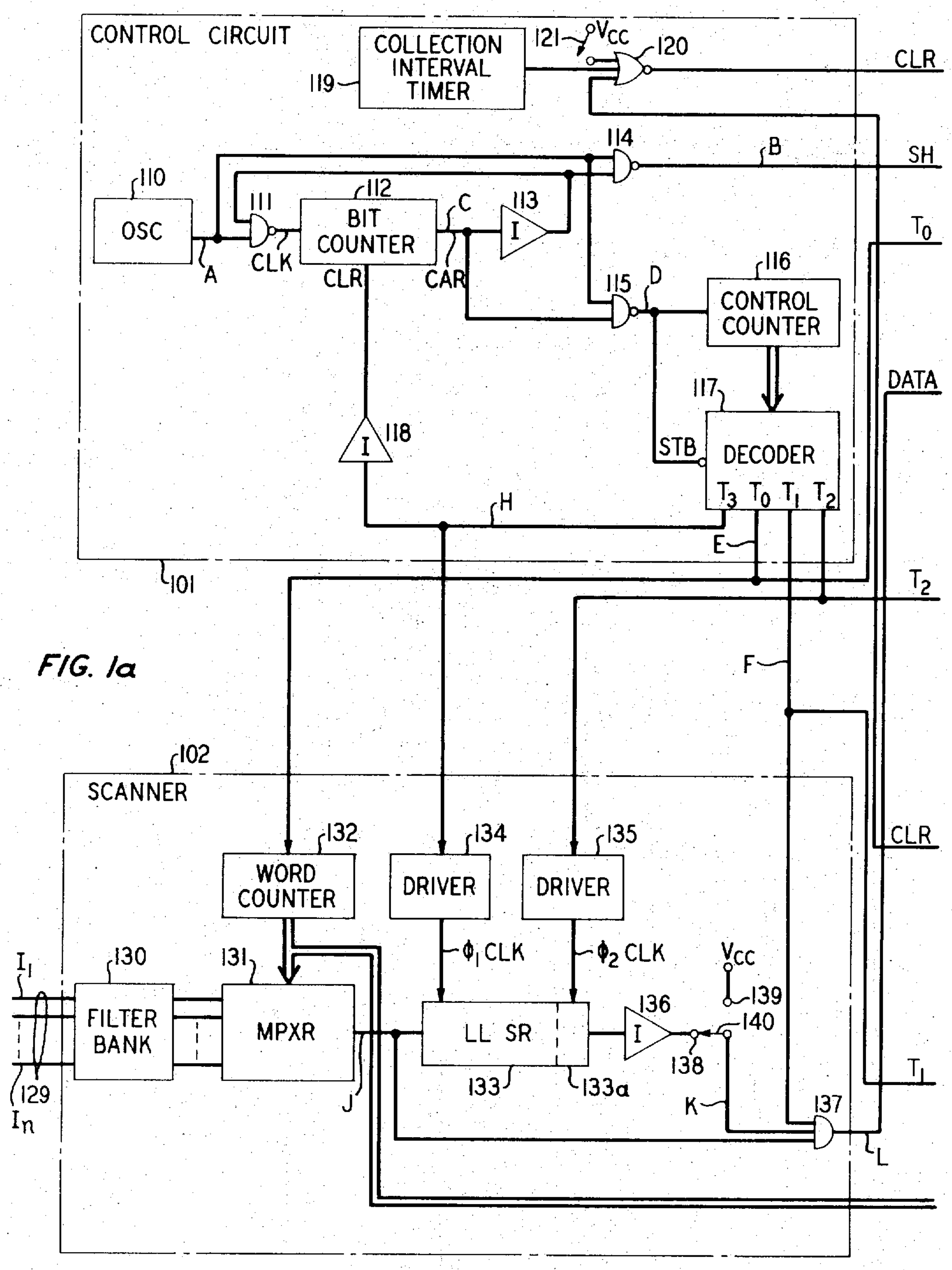
FIGS. 1*a* and 1*b*, when
Figure 1B:
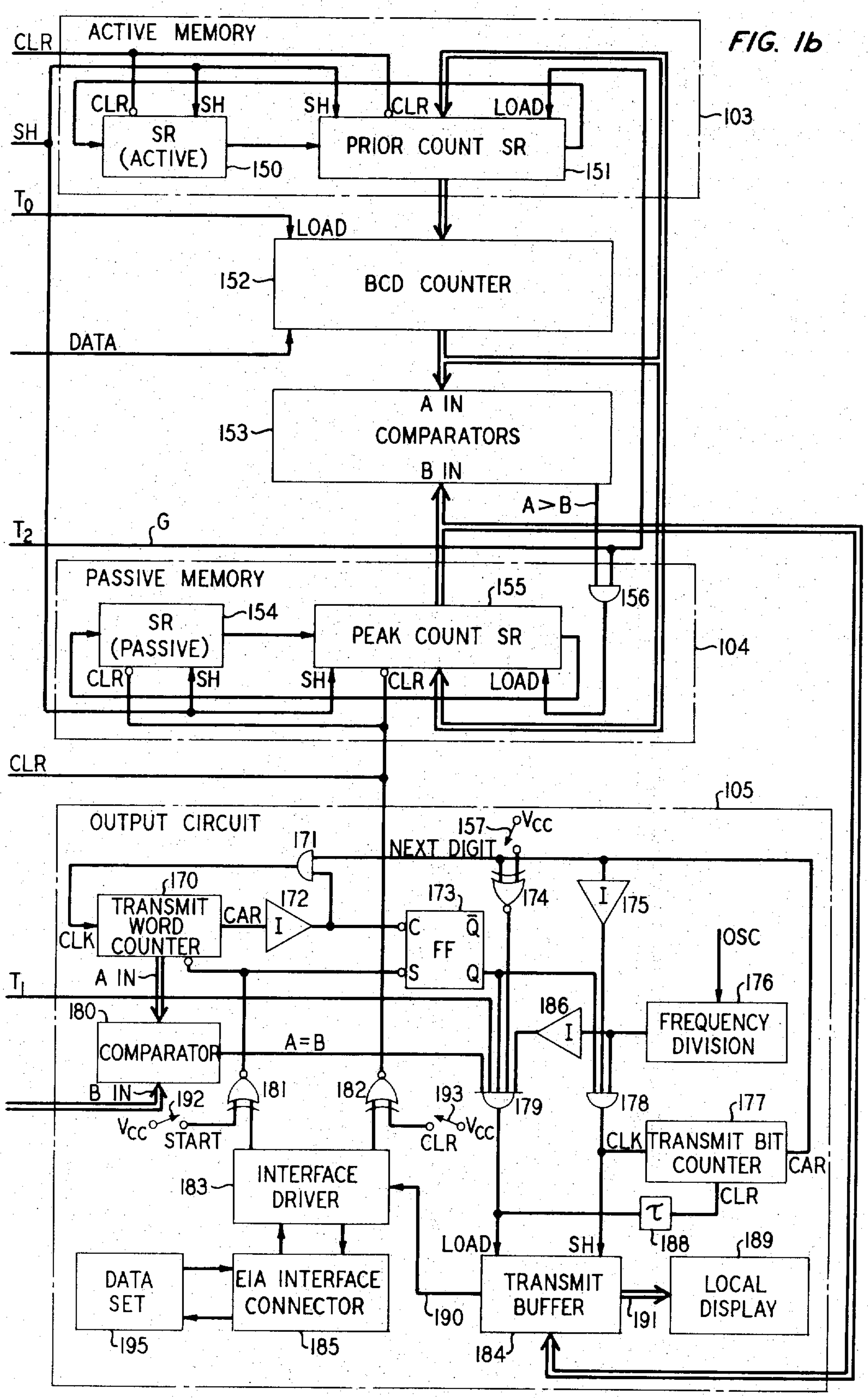
Figure 2:
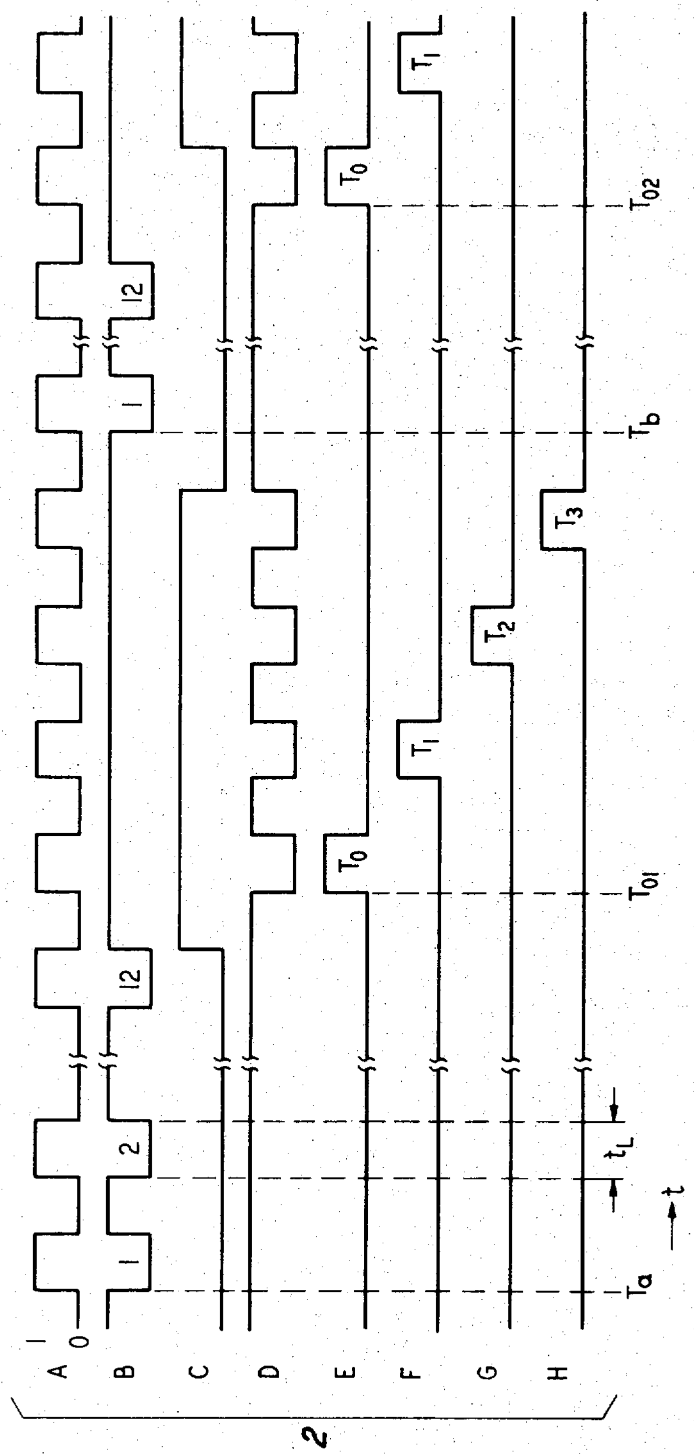
FIG. 2 is a timing chart showing the timing control signals.

Control circuit 101, shown in FIG. 1*a*, provides a set of four timing control signals $T_0$ through $T_3$ and 12 shift pulses for use in other parts of the apparatus. All of these signals are derived from a continuous train of clock signals, shown as waveform A in FIG. 2, provided by oscillator 110. The output of oscillator 110 is delivered to count control NAND gate 111 and shift control NAND gate 114. In the absence of a periodically generated carry pulse out of bit counter 112, count control gate 111 is enabled permitting bit counter 112 to count a predetermined number *n* of clock signals after which a carry pulse is generated. For the example the predetermined number *n* of clock signals counted is set at 12, this being the number of bits needed to define a three-digit decimal number in a binary coded decimal format. A bit in the above context is equivalent to a single clock signal or clock pulse. Control gate 114, in the absence of a carry pulse from bit counter 112, is also enabled and delivers 12 shift pulses to active memory 103 and to passive memory 104 shown in FIG. 1*b*. The shift pulses are shown as waveform B in FIG. 2.

During the counting interval, the output of bit counter 112 is in a low logic state, but after the 12 count the output goes to a high logic state indicating the carry condition. Waveform C in FIG. 2 illustrates the carry pulse. The carry output of bit counter 112 is inverted in inverter 113 and is fed back to count control gate 111. The inverted carry pulse disables count control gate 111 inhibiting the counting of any further clock pulses by bit counter 112. In addition to disabling count control gate 111, the inverted carry pulse disables shift control gate 114 thereby inhibiting further shift pulses from being delivered to active memory 103 and to passive memory 104.

An uninverted carry pulse is delivered to timing control NAND gate 115 which is in a disabled condition. The uninverted carry pulse in time coincidence with the continuous train of clock signals from oscillator 110 enables timing control gate 115 which in turn initiates a two-bit binary count in control counter 116. The output of timing control gate 115, shown as waveform D in FIG. 2, further provides a strobe input to decoder 117. Decoder 117 takes the two-bit binary coded control signals from control counter 116 and develops timing control signals $T_0$ through $T_3$ which are used in other parts of the apparatus.

Twelve shift pulses and a set of timing control signals $T_0$ through $T_3$, shown as waveforms E through H in FIG. 2, are generated for each input circuit 129, shown in FIG. 1*a*, to be scanned. Hence, to complete one scan for the example chosen, 96 shift pulses and eight sets of timing control signals $T_0$ through $T_3$ must be generated. The conclusion of timing control signal $T_3$, shown as waveform H in FIG. 2, clears bit counter 112 after being inverted in inverter 118 following the generation of each set of timing control signals $T_0$ through $T_3$ and the associated 12 shift pulses for each input circuit 129 to be scanned.

Having generated the necessary timing control signals the actual gathering of data is implemented generally in the following manner. The plurality of input circuits 129 are scanned in response to the timing control signals $T_0$ through $T_3$ in scanner 102. Active memory 103, shown in FIG. 1*b*, is operated synchronously with scanner 102, and stores the current number of specified signal state changes occurring in a collection interval on input circuits 129 while passive memory 104 stores the peak number of specified signal state changes occurring on input circuits 129 during a predetermined measurement interval. A comparison is made between the current number of specified signal state changes stored in active memory 103 and the peak number of specified signal state changes stored in passive memory 104. The terms "active" and "passive" are used in conjunction with the memories 103 and 104 to reflect the fact that memory 103 is constantly being updated with an increasing count whereas memory 104 is updated with an increasing count only when the count in memory 103 exceeds that contained in memory 104. The larger of the two numbers of specified signal state changes is routed to the passive memory 104 for storage. Upon request, the peak number of specified signal states changes is delivered to output circuit 105. In summary, the above illustrates the general manner in which the peak traffic data is obtained.

Figure 3:
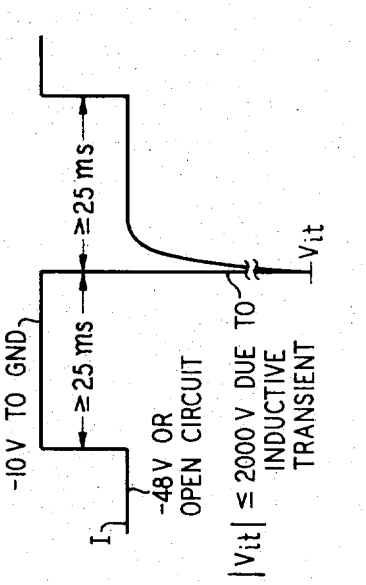
FIG. 3 is a typical input waveform on one of the circuits being scanned.

Specifically, input circuits 129, shown in FIG. 1*a*, are connected to scanner 102. A typical waveform on an input circuit 129 is shown in FIG. 3. When an input circuit 129 is idle there is either −48 volts on the circuit, or an open circuit condition exists. As the circuit is put into use the voltage level increases to a point between −10 volts and ground. This is the specified signal state change that is counted to give an indication of the traffic data. The −10 volts to ground voltage level is maintained for at least 25 milliseconds and, in general, persists for the duration of time that the circuit is in use. When the circuit is returned to its idle state, up to −2,000 volts may be present due to an inductive transient but this condition dissipates very rapdily. An idealized version of an input waveform is shown as $I_1$ in FIG. 4, the main difference being the removal of the inductive transient portion of the waveform. Pulses of duration $\tau_1$ $\tau_3$ represent periods when the circuit is in use with $\tau_1$ encompassing several scan cycles and $\tau_3$ a single scan cycle. The narrow pulse of $\tau_2$ duration represents a noise transient.

To eliminate a substantial portion of the inductive and noise transients, each input circuit 129 is filtered in filter bank 130 before it is connected to multiplexer 131. Filter bank 130 is comprised of a plurality of noise suppresion filters (not shown) which eliminate the major portion of any high frequency noise components in the input waveform. Multiplexer 131 selects in time sequence an individual input circuit 129 for sampling. This sequential selection occurs in response to a bit parallel update signal supplied by word counter 132. Word counter 132 is incremented in response to timing control signal $T_0$.

Figure 4:
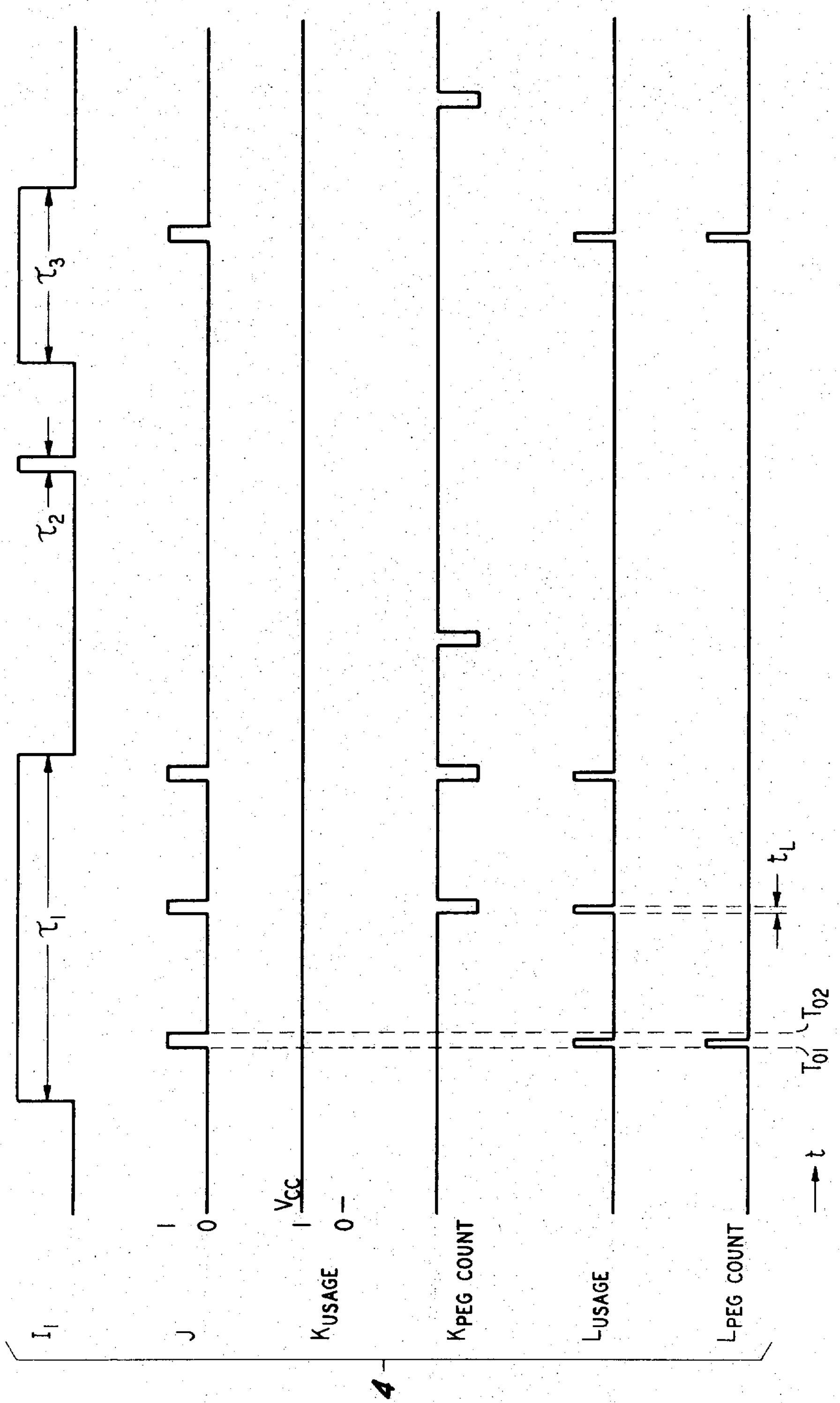
FIG. 4 is a timing chart showing the differences between the accumulation of peg count data and usage data.

Should peg count traffic data be the quantity of interest, peg count being defined as the registration of an indication of a circuit seizure or release, then switch 140 is manually closed through contact 138 and the multiplexer 131 output, as represented by waveform J in FIG. 4, is applied to a last-look shift register memory 133. Waveform J represents the output of multiplexer 131 when $I_1$ is the input and all other inputs are idle.

Last-look shift register memory 133 has a capacity for storing N bits, N being equal to the number of input circuits 129 to be scanned. These bits represent previous indications of the operational status of each of the input circuits 129 as determined on a directly preceding scan. The operational status indications are loaded serially into the last-look shift register memory 133 and the data already stored therein shifted one biit position upon reception of a $\Phi_1$ clock signal. Because last-look shift register memory 133 has an independently clocked single bit output buffer 133*a* in addition to its N bit capacity, this shift does not effect a change in the output delivered; an output occurs only upon reception of a $\Phi_2$ clock signal. The $\Phi_1$ clock signal is a level shifted version of the $T_3$ timing control signal and the $\Phi_2$ clock signal is a level shifted version of the $T_2$ timing control signal. The level shifting is implemented in drivers 134 and 135, respectively.

Upon reception of a $\Phi_2$ clock signal, the last digit stored in the last-look shift register memory 133 is outputted, inverted in inverter 136, passed through contact 138 of switch 140 and applied to last-look comparator AND gate 137. The output signal from last-look shift register memory 133, as applied to last-look comparator gate 137, is shown as waveform $K_{peg\ count}$ in FIG. 4. It should be noted that the signal passes through contact 138 of switch 140 since the data being gathered is peg count data. Also it should be noted that the input signal is still the $I_1$ waveform. When the input circuit 129 being scanned was idle during a directly preceding scan and is activated during the present scan, then the peg count is to be incremented. The comparison to detect the change in operational status, that is, comparing the status indication bit from the directly preceding scan with the status indication bit of the present scan, is implemented in the last-look comparator gate 137 and is effected when timing control signal $T_1$ is in time coincidence with the operational status indications being compared. When the two status indication bits are different, keeping in mind that the preceding bit is inverted by inverter 136, then an output is provided by last-look comparator gate 137. The results of the comparison for the example are shown as waveform $L_{peg\ count}$ in FIG. 4.

If the data to be gathered is traffic usage data, usage data being defined as the registration of an indication of whether an individual circuit is in use at the time of the scan, the output of multiplexer 131 is applied directly to last-look comparator gate 137 as well as to last-look shift register memory 133. Also applied to the last-look comparator gate 137 are timing control signal $T_1$ and a reference bias supply voltage $V_{cc}$ which is shown as waveform $K_{usage}$ in FIG. 4. Supply voltage $V_{cc}$ is delivered through contact 139 of switch 140. Since the switch 140 is closed through contact 139, no output signals are received from last-look shift register memory 133. Should the circuit being scanned be in use a pulse is delivered to BCD counter 152, shown in FIg. 1*b*, otherwise the last-look comparator gate 137 is disabled. The signal delivered to BCD counter 152 is shown as waveform $L_{usage}$ in FIG. 4.

It should be noted that the width of the pulses delivered to BCD counter 152, as typified by the waveforms L in FIG. 4, is the same as that of a clock or shift pulse and is shown in both FIGS. 2 and 4 as $t_L$. This is to be contrasted with the duration of each of the pulses out of multiplexer 131 which extends from the time a particular input circuit 129 is first sampled in a scan until the next succeeding input circuit 129 is sampled in the same scan. The duration of the muliplexer 131 output pulses is shown in FIg. 4 as extending from $T_{01}$ to $T_{02}$. FIg. 2 also clearly illustrates these differences in pulse widths.

Having generated the timing control signals $T_0$ through $T_3$ and the requisite number of shift pulses per data word, twelve for the example, the collection of traffic data and the determination of the peak value of such data is readily implemented. The memory operations for updating and comparing the contents thereof are the same whether peg count or usage data is being collected. The twelve shift pulses are applied to active memory 103 and to passive memory 104, shown in FIG. 1b. Active memory 103 is comprised of an active shift register 150 which holds (N−1) data words, seven for the example, and a prior count shift register 151. Prior count shift register 151 has capacity for a single data word. Passive memory 104 similarly is comprised of a passive shift register 154 and a peak count shift register 155. Active and passive shift registers 150 and 154 can be any of known types that have serial input and serial output and require clock pulses to shift out the data on a synchronous basis. Prior count and peak count shift registers 151 and 155 can be any of known types that have both serial and bit parallel inputs and outputs.

As the 12 shift pulses of a single circuit measurement cycle are applied to the active memory 103 and passive memory 104, a data word is serially transferred from the outputs of active shift register 150 and passive shift register 154 to prior count and peak count shift registers 151 and 155, respectively, and the data words that had been residing in prior count and peak count shift registers 151 and 155 are serially loaded back into the inputs of active shift register 150 and passive shift register 154, respectively. This shifting operation puts into the prior count shift register 151 the data word representing the count of signal state changes which have occurred on a particular input circuit 129 up through the preceding scan cycle, and it puts into peak count shift register 155 the data word representing the peak number of signal state changes which have occurred on that same input circuit 129. At the start of a measurement interval both active memory 103 and passive memory 104 are cleared. However, for any collection interval after the first such interval the two counts may not be equal, since only active memory 103 is cleared at the end of a collection interval.

When timing control signal $T_0$ occurs, the count in word counter 132 is incremented and multiplexer 131 selects the input circuit 129 associated with the data words in prior count and peak count shift registers 151 and 155. In addition, the data word in prior count shift register 151 is parallel loaded into BCD counter 152. The count in BCD counter 152 is updated, when timing control signal $T_1$ occurs, in accordance with the output signal indication from last-look comparator gate 137.

With the count updated a comparison is made between the current count of signal state changes temporarily stored in BCD counter 152 and the peak count of signal state changes stored in peak count shift register 155. The current count is applied to the A-input of comparator 153 and the peak count is applied to the B-input. This comparison is made in the interval between timing control signals $T_1$ and $T_2$. The result of the comparison is delivered on an A greater than B output to passive memory load AND gate 156. On the occurrence of timing control signal $T_2$, if the current count exceeds the peak count, passive memory load gate 156 is fully enabled and the new peak count is bit parallel loaded into peak count shift register 155. In addition, the updated current count, temporarily stored in BCD counter 152, is bit parallel loaded into prior count shift register 151.

As the data collection period ($T_b - T_a$), as shown in FIG. 2, for a single input circuit 129 is completed, bit counter 112, shown in FIG. 1*a*, is cleared by application of timing control signal $T_3$ and a new set of timing control signals $T_0$ through $T_3$ are generated for the next input circuit 129 to be scanned. The circuit operations described above are implemented for each input circuit 129 to be scanned and once a scan is completed a new scan is instituted automatically because the bit counter 112 and control counter 116 loop recycles continuously.

Output circuit 105 is utilized when the results of a measurement interval are desired. The peak traffic data can be advantageously outputted for utilization in two ways. One way encompasses a local readout and display implemented in response to a locally generated signal, that is, a signal generated at the site where the traffic data collection apparatus is located. The other way uses a data set to transmit the collected peak traffic data to a centralized collection facility at a remote location over a voice grade telephone circuit in response to a dialed-up request from the remote location. Regardless of which way is selected for the outputting of the collected data, the speed of outputting must be substantially reduced from the speed used in the collection process in order to allow the data to be transmitted over voice grade telephone circuits or to be visually displayed and observed. The slow down in the speed of outputting the peak traffic data is effected through the use of a transmit buffer register 184 and by reducing the circuit operating speeds by increasing the pulse width of the clock signals. This latter effect is achieved by frequency dividing the clock signals from oscillator 110 in frequency division circuit 176 to a frequency compatible with transmission rates over the telephone network.

The outputting of the peak traffic data for a local readout is initiated by momentarily closing switch 192. This closure applies voltage $V_{cc}$ to EXCLUSIVE NOR gate 181, thereby actuating it. If a remote readout is desired, the request for such a readout is transmitted from the central collection facility and received by data set 195 at the collection site. The remote request, after being processed by data set 195, is applied to an EIA interface connector 185 of a type complying with EIA RS–232–C specifications. An example of a connector which meets these specifications is a CINCH model DB25 P-C7 connector. The output from the EIA interface connector 185 is signal conditioned in interface driver 183. This signal would also actuate EXCLUSIVE NOR gate 181.

Actuating EXCLUSIVE NOR gate 181 clears transmit word counter 170 and sets flip-flop 173. Setting flip-flop 173 causes a signal to appear on the Q output and this signal partially enables buffere shift AND gate 178 and buffer load AND gate 179. The work count in transmit word counter 170 is applied to an A-input of comparator 180 and is compared with the word count in word counter 132 which is applied to a B-input. When the two counts agree an output is provided by comparator 180 on an A equal to B output circuit. This output further partially enables buffer load gate 179. Also applied to buffer load gate 179, further partially enabling it, is the output signal from frequency division circuit 176 after it has been inverted by inverter 186. An uninverted output signal from frequency division circuit 176 further partially enables buffer shift gate 178.

If a manual readout is desired, a next digit request signal is provided by momentarily closing switch 157. This causes voltage $V_{cc}$ to be applied to EXCLUSIVE NOR gate 174 actuating it and, in turn, partially enabling buffer load gate 179. Otherwise, a carry signal from transmit bit counter 177 actuates EXCLUSIVE NOR gate 174 thereby partially enabling buffer load gate 179.

The occurrence of timing control signal $T_1$ causes buffer load gate 179 to become fully enabled and this, in turn, allows transmit buffer register 184 to be bit parallel loaded with a data word from passive memory 104. Fully enabling buffer load gate 179 also clears transmit bit counter 177 after the output signal from the buffer load gate 179 is delayed by a slight amount of the order of a half of a clock pulse of the frequency divided clock signal. This delay is inserted merely to avoid any race condition in transmit bit counter 177 and is provided by delay network 188. Clearing transmit bit counter 177 removes the carry output signal and, following inversion by inverter 175, enables buffer shift gate 178 which has been partially enabled by the Q output signal from flip-flop 173. The enabling of buffer shift gate 178 initiates a count of the uninverted output signal from frequency division circuit 176 in transmit bit counter 177 and causes the data that has been bit parallel loaded in transmit buffer register 184 to be shifted out in parallel format to local display 189 over circuits 191 and in serial format to interface driver 183 over circuit 190.

When all of the data has been shifted out of transmit buffer register 184, transmit bit counter 177 which had been counting the bits of data shifted out generates a carry signal. The carry signal after inversion in inverter 175 disables buffer shift gate 178 and inhibits further clock signals from reaching transmit bit counter 177. It also inhibits further shift pulses from reaching transmit buffer register 184. In addition, the carry signal enables transmit word AND gate 171 which increments the count in transmit word counter 170. A new comparison is made by comparator 180, the next word of data is bit parallel loaded into transmit buffer register 184 and the process is repeated.

After all of the data words have been shifted out, transmit word counter 170 generates a carry signal which, following inversion in inverter 172, causes transmit word gate 171 to be disabled. The carry signal also clears flip-flop 173. An additional data readout is implemented only upon the receipt of a remote request or a local request which clears transmit word counter 170 and sets flip-flop 173.

Control of the time interval during which peak traffic data is to be measured is effected by collection interval timer 119, shown in FIG. 1*a*, or by manually applied control signals. In the manual case switch 121 is closed momentarily and this closure causes voltage $V_{cc}$ to be applied to NOR gate 120. The output of collection interval timer 119 is also applied to NOR gate 120. One additional input is provided to NOR gate 120 and this input is derived from EXCLUSIVE NOR gate 182 about which more will be said momentarily. When NOR gate 120 is enabled, by whatever means a clear signal is delivered to active memory 103 and a new collection interval is initiated. It should be noted that the passive memory 104 is not affected.

When an entirely new study is to be undertaken both the active memory 103 and the passive memory 104 are to be cleared. This can be effected in two ways. One way is by momentarily closing switch 193. This closure causes voltage $V_{cc}$ to be delivered to EXCLUSIVE NOR gate 182 which provides the third input to NOr gate 120 as noted earlier. Also the output of EXCLUSIVE NOR gate 182 is directly applied to passive memory 104 and this signal clears the contents of that memory. The output signal from NOR gate 120 provides the clear signal for active memory 103.

In summary, an apparatus and a method have been described which permit the gathering of peak load traffic data quickly and inexpensively. The peak traffic data can be advantageously obtained either at the request of a locally generated signal or by a request received from a centralized data collection facility at a remote location. In the latter case the transferral of data from the remote central office, wherein the peak load traffic data gathering apparatus is located, is effected over dialed-up voice grade circuits thereby eliminating the requirement for dedicated data links.

In all cases it is to be understood that the above described embodiment is illustrative of but a small number of the many possible specific embodiments which can represent application of the principles of the invention. Thus, numerous and varied other embodiments can readily be devised in accordance with these principles by those skilled in the art without departing from the spirit and scope of the invention.

What is claimed is:

1. Apparatus for gathering peak load traffic data for signal communication circuits, said apparatus comprising, means for sequentially and recurrently sampling signal states on said circuits, means for counting separately, and over each of plural periodically recurring scan time intervals, specified signal state changes in samples for each of said circuits, first memory means for storing current numbers of said specified signal state changes occurring in each of said circuits in a predetermined collection interval, second memory means for storing peak numbers of said specified signal state changes occurring in each of said circuits during a predetermined measurement interval, a measurement interval being substantially larger than a collection interval, means for comparing the current numbers of specified signal state changes stored in said first memory means with the peak numbers of specified signal state changes stored in said second memory means, and control circuit means for routing the larger of the two numbers of specified signal state changes ascertained by the comparison to said second memory means for storage.

2. The peak load traffic data gathering apparatus in accordance with claim 1 including means for generating a plurality of timing control signals, and means for controlling the duration of said predetermined collection interval.

3. The peak load traffic data gathering apparatus in accordance with claim 2 wherein said timing control signal generating means includes oscillator means for generating a continuous train of clock signals, means for periodically generating a carry pulse for inhibiting said continuous train of clock signals after a predetermined number have been generated, said predetermined number set in accordance with a maximum traffic data count to be accommodated, counter means, enabled by a coincidence condition between said carry pulse and said continuous train of clock signals, for generating binary coded control signals, and means for decoding said binary coded control signals into said timing control signals.

4. The peak load traffic data gathering apparatus in accordance with claim 1 wherein the sampling means includes
a filter bank in which noise suppression filters are connected to each of said circuits, and
multiplexing means for selecting the circuit to be sampled.

5. The peak load traffic data gathering apparatus in accordance with claim 1 wherein the sampling means includes
a coincidence gate,
means for applying a continuous enable signal to one gate input,
means for applying samples to another gate input for actuating said gate, and
means for coupling an output from said gate to said counting means.

6. The peak load traffic data gathering apparatus in accordance with claim 1 wherein the sampling means includes
a last-look memory for storing samples of operational status of said circuits ascertained during a directly preceding scan,
means for inverting the output status samples from said last-look memory,
a coincidence gate,
means for applying said inverted output status samples to one gate input enabling said gate,
means for applying current circuit status samples to another gate input for actuating said gate, and
means for coupling an output from said gate to said counting means.

7. The peak load traffic data gathering apparatus in accordance with claim 6 wherein the sampling means further includes
a bias input,
said means for applying said inverted output status samples to one input of said gate includes means for selectively enabling said gate from either said bias input or said inverter output.

8. The peak load traffic data gathering apparatus in accordance with claim 1 wherein the first memory means comprises
a first shift register having a bit serial input and a bit serial output,
a second shift register having both bit serial and bit parallel inputs and outputs,
means for coupling synchronously said bit serial output of said first shift register to said bit serial input of said second shift register and said bit serial output of said second shift register to said bit serial input of said first shift register,
means for coupling said bit parallel output of said second shift register to said counting means, and
means for applying said counting means output to said bit parallel input of said second shift register.

9. The peak load traffic data gathering apparatus in accordance with claim 1 wherein the second memory means comprises
a first shift register having a bit serial input and a bit serial output,
a second shift register having both bit serial and bit parallel inputs and outputs,
means for coupling synchronously said bit serial output of said first shift register to said bit serial input of said second shift register and said bit serial output of said second shift register to said bit serial input of said first shift register,
means for coupling said bit parallel output of said second shift register to said comparing means, and
means for applying said counting means output to said bit parallel input of said second shift register.

10. The peak load traffic data gathering apparatus in accordance with claim 1 including
output circuit means for utilizing said peak numbers of specified signal state changes stored in said second memory means, and
means for coupling said second memory means to said output circuit means.

11. The peak load traffic data gathering apparatus in accordance with claim 10 wherein the output circuit means includes
a buffer register having a bit parallel output and a bit serial output,
display means,
means for coupling said bit parallel output of said buffer register to said display means,
selectable data transmission means and
means for coupling said bit serial output of said buffer register to said data transmission means.

12. The peak load traffic data gathering apparatus in accordance with claim 11 wherein the output circuit means further includes
circuit means for controlling the loading of peak load traffic data stored in said second memory means into said buffer register,
EXCLUSIVE NOR means for enabling said control loading circuit means,
interface driver circuitry responsive to a remotely generated output request decoded by said data transmission means for enabling said EXCLUSIVE NOR means, and
means for enabling said EXCLUSIVE NOR means in response to a locally generated output request.

13. Apparatus for gathering peak load traffic data for signal communication circuits, said apparatus comprising
means for sequentially and recurrently sampling signal states on said circuits,
means for counting separately, and over each of plural periodically recurring collection time intervals, specified signals state changes in samples for each of said circuits,
means, operative at the end of each of said collection intervals, for separately storing outputs from said counting means for each of said circuits,
means for comparing corresponding outputs of said storing means and said counting means, and
means, operative at the end of each of said collection intervals, for inhibiting input to said storing means from said counting means outputs unless signals at such outputs are greater than the contents of said storing means.

14. A method for gathering traffic data from signal communication circuits and manipulating the data between first and second memory means to obtain peak load traffic data for presentation to output circuitry comprising the steps of
sampling sequentially and recurrently, signal states on said circuits,
counting separately, and over each of plural periodically recurring scan time intervals, specified signal state changes in samples for each of said circuits, storing in said first memory means current numbers of specified signal state changes occurring in each of said circuits in a predetermined collection interval, storing in said second memory means peak numbers of specified signal state changes occurring in each of said circuits during a predetermined measurement interval, comparing during each of said plural periodically recurring scan time intervals the current numbers of specified signal state changes stored in said first memory means with the peak numbers of specified signal state changes stored in said second memory means, routing the larger of the two numbers of specified signal state changes to said second memory means for storage, and delivering said peak number of specified signal state changes to said output circuit for utilization.

* * * * *